C. L. BRUMFIELD.
PLOW FENDER.
APPLICATION FILED JULY 16, 1912.
1,067,638.
Patented July 15, 1913.
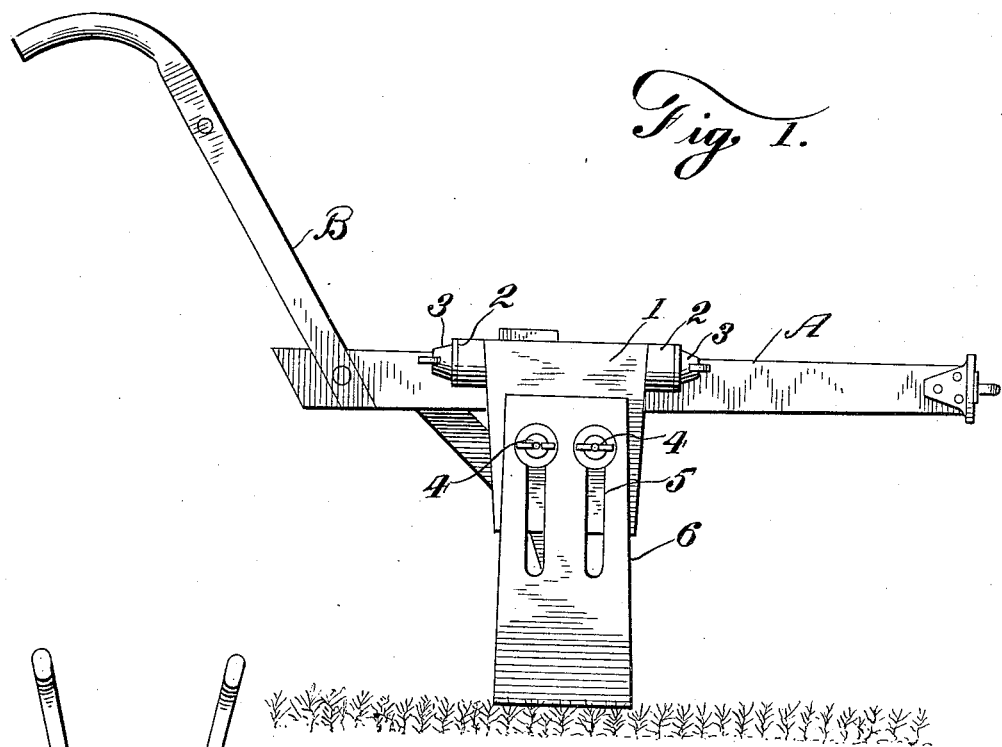
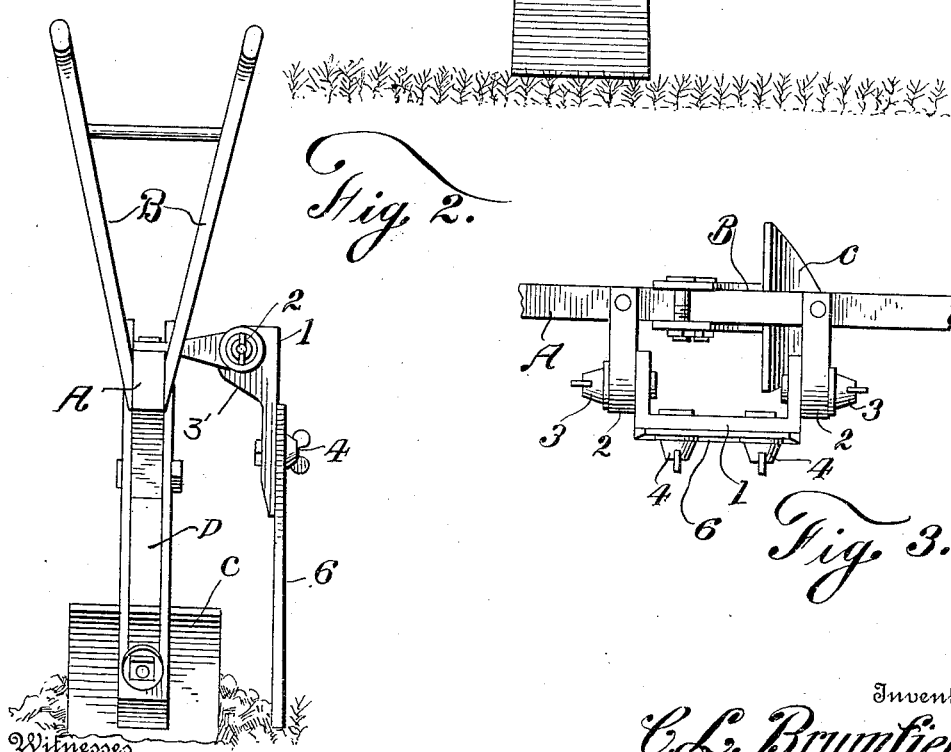
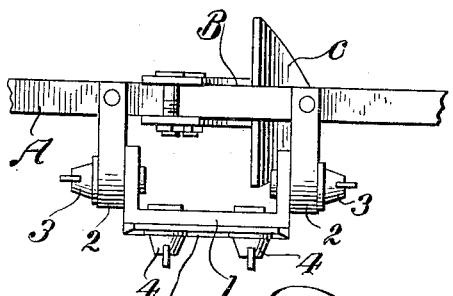

UNITED STATES PATENT OFFICE.

CADWELL L. BRUMFIELD, OF BOGALUSA, LOUISIANA.

PLOW-FENDER.

1,067,638.

Specification of Letters Patent. Patented July 15, 1913.

Application filed July 16, 1912. Serial No. 709,697.

*To all whom it may concern:*

Be it known that I, CADWELL L. BRUMFIELD, a citizen of the United States, residing at Bogalusa, in the parish of Washington and State of Louisiana, have invented certain new and useful Improvements in Plow-Fenders, of which the following is a specification.

My invention relates to devices to be attached to plows, cultivators and the like to prevent the soil turned up by the plow blades from covering the growing plants, and has for its object the provision of an improved fender consisting of a plate mounted for longitudinal adjustment on the plow beam and also mounted to be swung relatively to the plow beam.

My invention will be described in detail hereinafter and illustrated in the accompanying drawings, in which, Figure 1 is a side view in elevation of a plow showing my improved cultivator mounted thereon; Fig. 2, a rear view; and Fig. 3, a top plan view of a fragment of the plow beam showing the fender in position.

In the drawings similar reference characters will be used to designate corresponding parts in the several views.

A indicates a plow beam of the ordinary construction having the handles B mounted thereon and the plow C secured to a suitable standard mounted on said beam.

My improved fender consists of a plate 1 pivotally mounted on ears 2 secured to the beam A, said plate 1 being mounted between said ears by means of bolts and wing nuts 3. The plate 1 is formed adjacent its upper edge with the lateral projections 3', which are apertured for the reception of pivot bolts. 4 indicates bolts secured in said apertured projections and adapted to engage longitudinal slots 5 in a plate 6 constituting my improved fender, said plate 6 being positioned opposite the plow beam C to prevent the soil turned up by said beam from being thrown against growing plants.

In operation, it will be understood that by means of the pivotal mounting of the plate 1 between the ears 2 and the slidably adjustable mounting of the plate 6 on the plate 1, that my improved fender is capable of being adjusted both laterally and longitudinally for its most effectual operation and to accommodate the fender to the work to which it is applied.

I am aware that plow fenders have been applied to plows heretofore for the same purpose as my plow fender, but the devices heretofore used have not been capable of the adjustment employed by my fender.

Having thus described my invention, what I claim is:—

1. The combination with a plow beam, of a fender comprising a pair of laterally extending apertured ears secured to said plow beam, a connecting plate formed adjacent its upper end with lateral apertured projections, pivot members passing through the apertured ears and projections whereby the connecting plate is positioned, a fender plate longitudinally slotted, and means for adjustably connecting said fender plate to the connecting plate.

2. The combination with a plow beam having spaced laterally extending ears connected to one side thereof, said ears being formed with transverse openings, of a fender attachment comprising a connecting plate formed adjacent its upper edge with lateral apertured projections, pivot bolts passing through said apertured projections and ears, a depending fender plate longitudinally slotted, and means adjustably connecting the fender plate to the connecting plate.

3. The combination of a plow beam, parallel spaced ears carried upon one side of said beam, the ears being formed adjacent their outer ends with transverse openings, a depending connecting plate formed adjacent its upper edge with inwardly extending apertured projections, pivot bolts passing through said ears and projections, a depending fender plate formed with a plurality of longitudinal slots, and fastening means passing through the connecting plate and said slots whereby the fender plate is adjustably secured to the connecting plate.

In testimony whereof I affix my signature in presence of two witnesses.

CADWELL L. BRUMFIELD.

Witnesses:
J. B. PURVIS, Jr.,
E. TALLEY.